US008983835B2

(12) United States Patent
Wong et al.

(10) Patent No.: US 8,983,835 B2
(45) Date of Patent: Mar. 17, 2015

(54) ELECTRONIC DEVICE AND SERVER FOR PROCESSING VOICE MESSAGE

(75) Inventors: Shih-Fang Wong, New Taipei (TW); Tsung-Jen Chuang, New Taipei (TW); Bo Zhang, Shenzhen (CN)

(73) Assignees: Fu Tai Hua Industry (Shenzhen) Co., Ltd, Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 915 days.

(21) Appl. No.: 13/173,177

(22) Filed: Jun. 30, 2011

(65) Prior Publication Data

US 2012/0245935 A1    Sep. 27, 2012

(30) Foreign Application Priority Data

Mar. 22, 2011    (CN) .......................... 2011 1 0069293

(51) Int. Cl.
| | |
|---|---|
| G10L 15/00 | (2013.01) |
| G10L 15/26 | (2006.01) |
| H04M 1/64 | (2006.01) |
| H04W 4/12 | (2009.01) |
| H04W 4/18 | (2009.01) |

(52) U.S. Cl.
CPC .............. H04W 4/12 (2013.01); G10L 15/265 (2013.01); H04W 4/18 (2013.01)
USPC .......... 704/235; 704/231; 704/251; 704/254; 704/258; 704/260; 704/270; 704/270.1; 704/275; 379/88.01; 379/88.13; 379/88.14; 379/88.17

(58) Field of Classification Search
CPC ......... G10L 15/00; G10L 15/08; G10L 15/19; G10L 15/26; G10L 15/265; G10L 2015/00; G10L 2015/08; G10L 2015/081; G10L 2015/085; G10L 2015/088; H04M 3/4936; H04M 2210/40; H04M 1/72552
USPC ......... 704/231, 235, 251, 254, 258, 260, 270, 704/270.1, 275; 379/88.01, 88.13, 88.14, 379/88.17

See application file for complete search history.

(56) References Cited

U.S. PATENT DOCUMENTS

| | | | | |
|---|---|---|---|---|
| 6,654,448 | B1 * | 11/2003 | Agraharam et al. | 379/88.14 |
| 6,775,360 | B2 * | 8/2004 | Davidson et al. | 379/88.14 |
| 6,781,962 | B1 * | 8/2004 | Williams et al. | 370/259 |
| 6,934,552 | B2 * | 8/2005 | Holley et al. | 455/466 |
| 7,698,136 | B1 * | 4/2010 | Nguyen et al. | 704/241 |
| 8,055,243 | B2 * | 11/2011 | Li | 455/412.2 |
| 8,560,323 | B2 * | 10/2013 | Madhavapeddi et al. | 704/275 |
| 2003/0046071 | A1 * | 3/2003 | Wyman | 704/235 |
| 2004/0062365 | A1 * | 4/2004 | Agraharam et al. | 379/88.14 |
| 2005/0154586 | A1 * | 7/2005 | Liu | 704/235 |
| 2005/0266829 | A1 * | 12/2005 | Tran et al. | 455/412.1 |
| 2005/0288926 | A1 * | 12/2005 | Benco et al. | 704/235 |
| 2006/0182236 | A1 * | 8/2006 | Kapoor | 379/88.14 |
| 2007/0127640 | A1 * | 6/2007 | Brunel | 379/88.13 |

(Continued)

*Primary Examiner* — Paras D Shah
(74) *Attorney, Agent, or Firm* — Novak Druce Connolly Bove + Quigg LLP

(57) ABSTRACT

An electronic device includes a voice processing unit, a wireless communication unit, and a combining unit. The voice processing unit receives speech signals. The wireless communication unit sends the speech signals to a server. The server converts the speech signals into a text message. The wireless communication unit receives the text message from the server. The combining unit combines the text message and the speech signals into a combined message. The wireless communication unit further sends the combined message to a recipient. A related server is also provided.

9 Claims, 2 Drawing Sheets

(56) References Cited

U.S. PATENT DOCUMENTS

| | | | |
|---|---|---|---|
| 2007/0208570 A1* | 9/2007 | Bhardwaj et al. | 704/270.1 |
| 2009/0172108 A1* | 7/2009 | Singh | 709/206 |
| 2010/0298009 A1* | 11/2010 | Dantzler et al. | 704/235 |
| 2011/0029315 A1* | 2/2011 | Nichols et al. | 704/275 |
| 2011/0305326 A1* | 12/2011 | Poirier et al. | 379/88.13 |
| 2012/0029917 A1* | 2/2012 | Chang et al. | 704/235 |

\* cited by examiner

ELECTRONIC DEVICE AND SERVER FOR PROCESSING VOICE MESSAGE

BACKGROUND

1. Technical Field

The present disclosure relates to an electronic device and a server for processing voice messages.

2. Description of Related Art

Many mobile communication devices such as mobile phones can receive and send short messages. Typically, a key assembly equipped on the mobile communication device is used for a user to edit the short messages. However, it takes the user a lot of time to edit the short messages because of the limited room of the key assembly. Furthermore, it is inconvenient when the user does not have a free hand to edit the short messages.

Therefore, what is needed is an electronic device and a server for processing voice messages to alleviate the limitations described above.

BRIEF DESCRIPTION OF THE DRAWINGS

The components in the drawings are not necessarily drawn to scale, the emphasis instead being placed upon clearly illustrating the principles of an electronic device and a server for processing voice messages. Moreover, in the drawings, like reference numerals designate corresponding sections throughout the several views.

DETAILED DESCRIPTION

Figure 1:
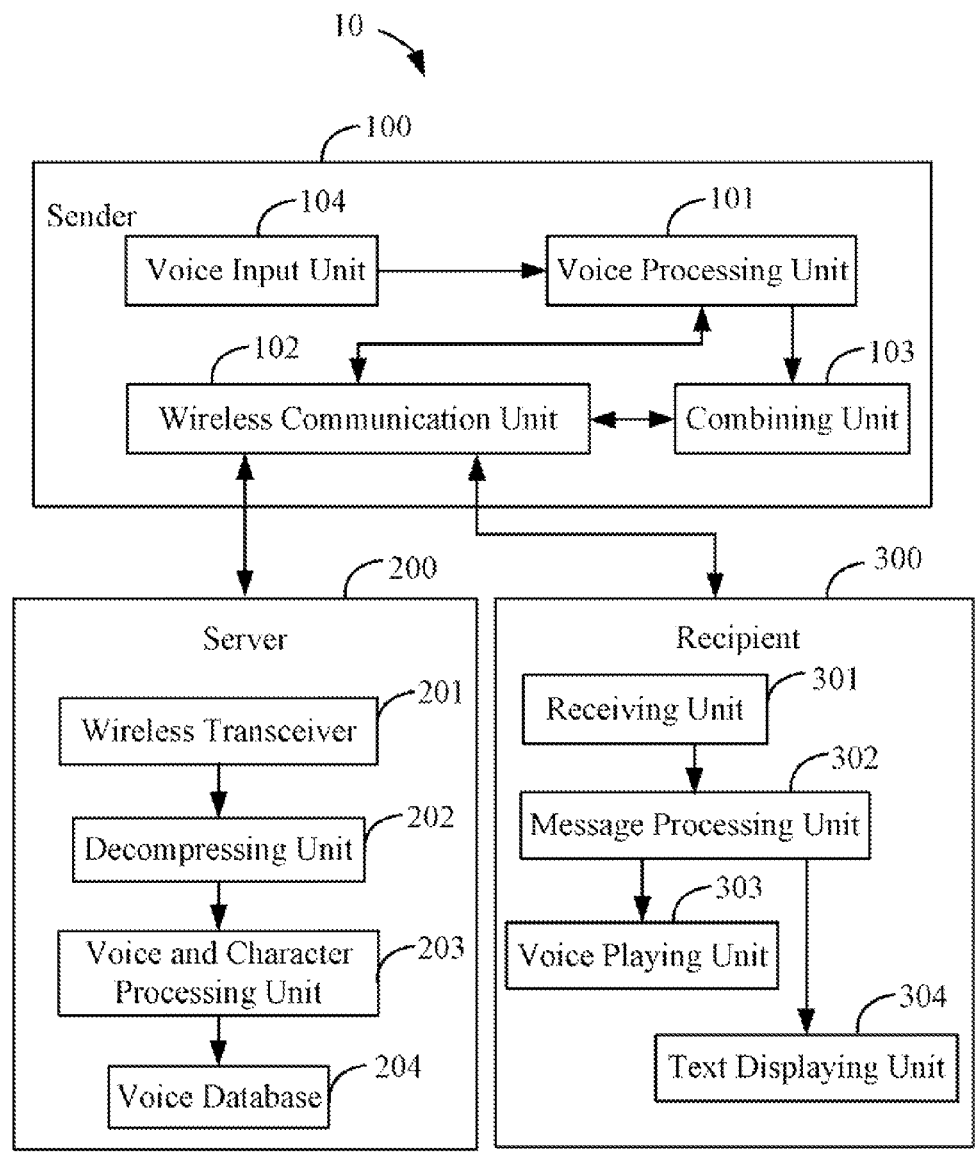
FIG. 1 is a block diagram of a voice messaging system in accordance with an exemplary embodiment.

Referring to FIG. 1, a voice messaging system 10 is disclosed as an exemplary embodiment. The voice messaging system 10 includes a sender 100, a server 200, and a recipient 300. In the embodiment, both the sender 100 and the recipient 300 are electronic devices with short message receiving and sending functions. The electronic devices may be mobile communication apparatuses such as mobile phones or personal digital assistants. The sender 100 communicates with the server 200 via the GPRS or the 3G communication network. The server 200 is a computer.

The sender 100 includes a voice processing unit 101, a wireless communication unit 102, a combining unit 103, and a voice input unit 104. In the embodiment, the sender 100 has a voice-message mode, when the sender 100 enters the voice-message mode, the voice input unit 104 equipped in the sender 100 is started. The voice input unit receives the voices from a user, and converts the voices to speech signals.

The voice processing unit 101 is configured for receiving the speech signals, converting the speech signals to digital format, and transmitting the digital speech signals to the wireless communication unit 102.

The wireless communication unit 102 is configured for communicating with the server 200 and the recipient 300. In the embodiment, the wireless communication unit 102 transmits the digital speech signals to the server 200, and receives information from the server 200.

The server 200 includes a wireless transceiver 201, a decompression unit 202, a voice and character processing unit 203, and a voice database 204. The voice database 204 includes a number of speech datum and a number of words and phrases associated with the corresponding speech datum. The speech datum includes a number of voice words and a number of voice phrases. In the embodiment, the voice words are selected from the group consisting of: Chinese characters, alphabetic characters and the words, Arabic numerals. The voice phrases are selected from the group consisting of: commonly used terms, phrases, idioms and sentences. In other embodiments, the voice database 204 can include speech datum and text information corresponding to the speech datum according to actual needs.

The wireless transceiver 201 is configured for receiving digital speech signals transmitted from the sender 100.

The decompression unit 202 is configured for decompressing the digital speech signals from the wireless transceiver 201, and transmitting the speech signals to the voice and character processing unit 203.

The voice and character processing unit 203 is configured for retrieving speech data matching the digital speech signals from the voice database 204. In the embodiment, the voice and character processing unit 203 first determines whether voice phrases match at least a part of the digital speech signals existing in the voice database 204. And retrieves those voice phrases from the voice database 204 when voice phrases match at least a part of the digital speech signals from the voice database 204; the voice and character processing unit 203 secondly retrieves voice words from the voice database 204 matching the remaining part of the digital speech signals.

The voice and character processing unit 203 is further configured for retrieving words and phrases corresponding to the retrieved speech data and generating a text message containing the retrieved words and phrases, and transmitting the text message to the wireless transceiver 201.

The wireless transceiver 201 further transmits the text message to the sender 100.

The combining unit 103 of the sender 100 is configured for combining the text message and the digital speech signals into a combined message, compressing the combined message, and transmitting the combined message to the wireless communication unit 102. In an alternative embodiment, the combining unit 103 does not compress the combined message.

The wireless communication unit 102 is further configured for transmitting the combined message to the recipient 300 selected by the user.

The recipient 300 includes a receiving unit 301, a message processing unit 302, a voice playing unit 303, and a text displaying unit 304.

The voice processing unit 302 is configured for decompressing the combined message and transmitting the speech signals to the voice playing unit 303 and transmitting the text message to the text displaying unit 304. The voice playing unit 303 is configured for reading and playing the speech signals. The text displaying unit 304 displays the text message. In an alternative embodiment, the recipient 300 is programmed to allow the user to select to read and play the speech signals, or to display the text message, or to do both.

With such configuration, when the user of the sender 100 needs to send a short massage to the recipient 300, the user only needs to speak to the sender 100, the sender 100 transmits voices of the user to the server 200. The server 200 generates a text message corresponding to the voices and feeds back the text message to the sender 100. The sender 100 combines the voices of the user and the text message to a combined message, and sends the combined message to the recipient 300. The recipient 300 reads and plays the voices of the user. Thus, it is more convenient and user friendly.

Figure 2:
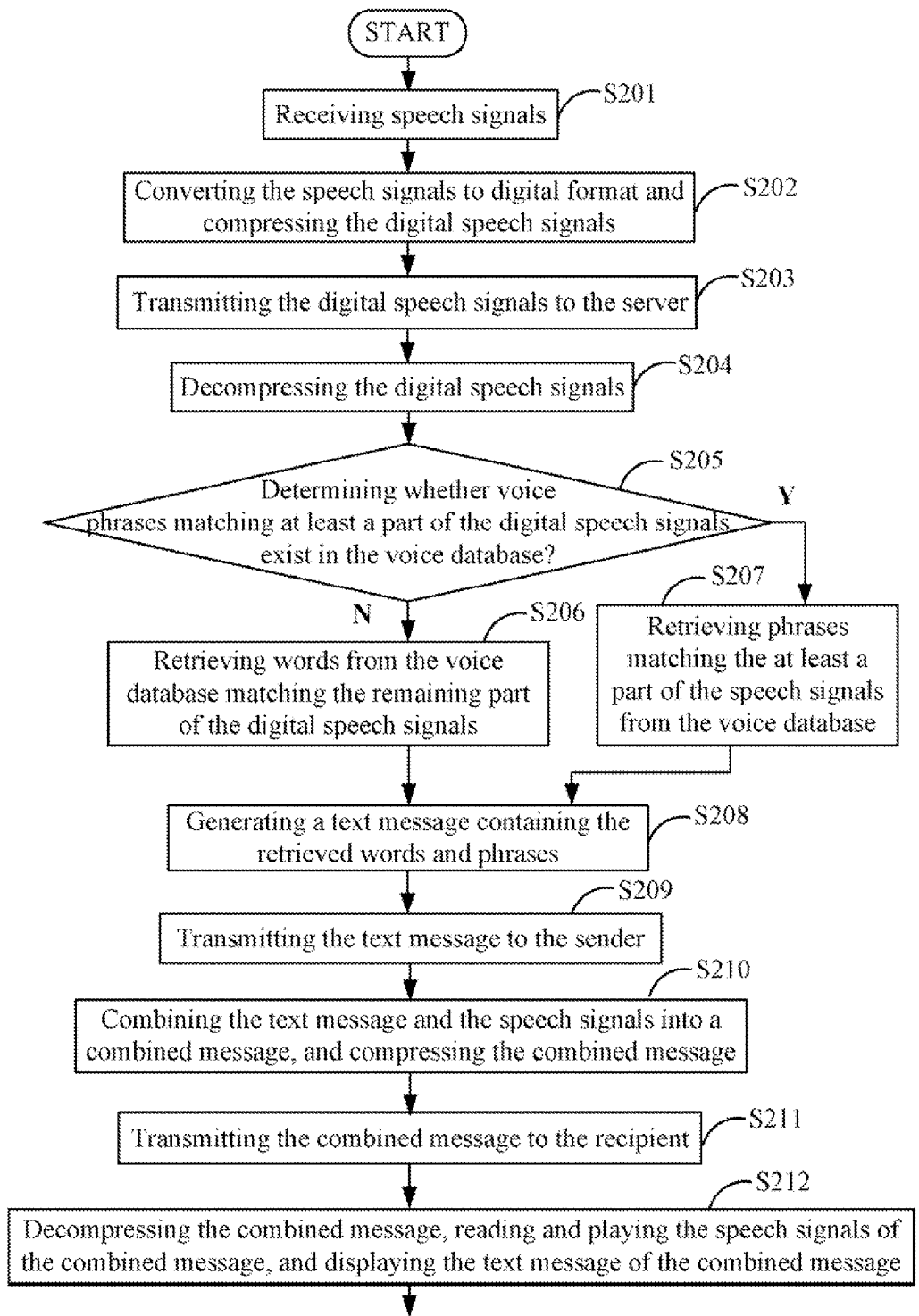
FIG. 2 is a flowchart of a voice message processing method for voice messaging systems, such as the one of FIG. 1, in accordance with the exemplary embodiments.

Referring to FIG. 2, a flowchart of a voice message processing method for the voice messaging system 10 of FIG. 1 is shown. The method includes the following steps, each of which is tied to various components contained in the voice messaging system 10 as shown in FIG. 1.

In step 201, the voice processing unit 101 receives speech signals transmitted from the voice input unit 104.

In step 202, the voice processing unit 101 converts the speech signals to digital format and compresses the digital speech signals. In an alternative embodiment, the digital speech signals are not compressed.

In step S203, the wireless communication unit 102 transmits the digital speech signals to the server 200.

In step S204, the decompression unit 202 decompresses the digital speech signals.

In step S205, the voice and character processing unit 203 determines whether voice phrases matching at least a part of the digital speech signals exist in the voice database 204, if yes, the process goes to step S207, otherwise the process goes to step S206.

In step S206, the voice and character processing unit 203 retrieves words from the voice database 204 matching the remaining part of the digital speech signals.

In step S207, the voice and character unit 203 retrieves phrases matching the at least a part of the speech signals from the voice database 204.

In step S208, the voice and character processing unit 203 generates a text message containing the retrieved words and phrases.

In step S209, the wireless transceiver 201 transmits the text message to the sender 100.

In step S210, the combining unit 103 of the sender 100 combines the text message and the speech signals of the user into a combined message, and compresses the combined message. In an alternative embodiment, the combined message is not compressed.

In step S211, the wireless communication unit 102 transmits the combined message to the recipient 200.

In step S212, the recipient 300 decompresses the combined message, and reads and plays the speech signals of the combined message via the voice playing unit 303, and displays the text message of the combined message via the text displaying unit 304. In an alternative embodiment, recipient 300 is programmed to allow the user to select to read and play the speech signals, or to display the text message, or to do both.

Although the present disclosure has been specifically described on the basis of the embodiments thereof, the disclosure is not to be construed as being limited thereto. Various changes or modifications may be made to the embodiments without departing from the scope and spirit of the disclosure.

What is claimed is:

1. An electronic device comprising:
    a voice processing unit configured for receiving speech signals;
    a wireless communication unit configured for sending the speech signals to a server, the server configured to convert the speech signals into a text message, the wireless communication unit configured for receiving the text message from the server; and
    a combining unit configured for combining the text message and the speech signals into a combined message;
    wherein the combining unit comprises a processor connected to the voice processing unit and the wireless communication unit, the combining unit is also configured for compressing the combined message and transmitting the combined message to the wireless communication unit, and the wireless communication unit is further configured for sending the compressed combined message to a recipient device.

2. The electronic device as described in claim 1, further comprising a voice playing unit configured for reading and playing the speech signals of the combined message.

3. The electronic device as described in claim 1, further comprising a text displaying unit configured for displaying the text message of the combined message.

4. The electronic device as described in claim 1, being a mobile phone.

5. A voice and message processing method comprising:
    receiving speech signals at an electronic device;
    sending, from the electronic device, the speech signals to a server to convert the speech signals into a text message;
    receiving, at the electronic device, the text message from the server;
    combining, at the electronic device, the text message and the speech signals into a combined message;
    compressing, at the electronic device, the combined message;
    sending, from the electronic device, the compressed combined message to a recipient device different from the electronic device.

6. The voice and message processing method as described in claim 5, further comprising reading and playing the speech signals of the combined message at the recipient device.

7. The voice and message processing method as described in claim 5, further comprising reading and playing the speech signals of the combined message at the recipient device.

8. The voice and message processing method as described in claim 5, further comprising:
    retrieving, at the server, speech data matching the speech signals from a voice database stored in the server; and
    retrieving, at the server, words and phrases corresponding to the retrieved speech data, and generating the text message containing the retrieved words and phrases.

9. The voice and message processing method as described in claim 8, wherein retrieving, at the server, words and phrases corresponding to the retrieved speech data, and generating the text message containing the retrieved words and phrases comprises: firstly retrieving, at the server, voice phrases matching at least a part of the speech signals from the voice database, and secondly retrieving voice words from the voice database matching the remaining part of the speech signals.

* * * * *